Figure 1:
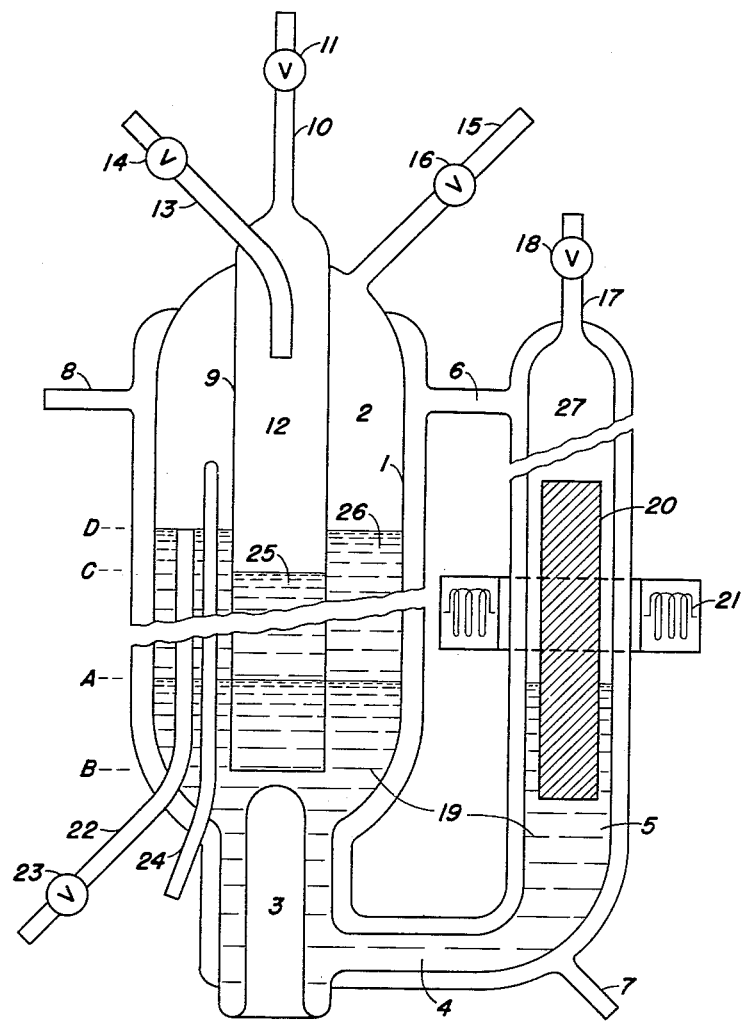

Dec. 20, 1955     A. W. GOLDSBARRY     2,727,855

DIFFERENTIAL PRESSURE REACTOR AND DISTILLING APPARATUS

Filed Nov. 26, 1951

INVENTOR

BY ALBERT W. GOLDSBARRY

ATTORNEY

United States Patent Office 2,727,855
Patented Dec. 20, 1955

2,727,855

DIFFERENTIAL PRESSURE REACTOR AND DISTILLING APPARATUS

Albert W. Goldsbarry, Crystal Lake, Ill., assignor to The Pure Oil Company, Chicago, Ill., a corporation of Ohio Application November 26, 1951, Serial No. 258,137

2 Claims. (Cl. 202—181)

This invention relates to an apparatus and method for conducting the vaporization and fractionation of fluids or reactants during their distillation or reaction in a plurality of differential pressure zones.

The conventional form of fractionator or rectifier tower employing bubble tray columns wherein vapors are fractionated by continuous counter-current contact with liquid reflux develops considerable back pressure on the vaporizing zones depending upon the tower throughput, the operating pressures, and the number of trays employed. The heated packed tower which functions in a manner similar to that of the bubble tray column is another type of distilling unit which has as its principal disadvantage the very large pressure drop which occurs in the length of the column. This requires increases in the amount of heat necessary to create sufficient pressure to force the vapors up through these conventional forms of rectifiers.

It is desirable in distilling columns to, first, subject the fluid being distilled to variations in pressure which are optimum for the rapid and complete evaporation of each of the individual components therein having different distilling characteristics, and, secondly, to control the residence time of such distilling fluids within these successive differential pressure zones, independently of the rate of withdrawal of vapors from these zones and of the rate of heat input.

It is often desirable in conducting catalytic or non-catalytic reactions to be able to preheat the reactants to the desired reaction temperature prior to their contacting each other in the reaction zone. Numerous methods have been devised wherein the reactants are individually preheated and/or vaporized and injected into the reaction zone, with or without a catalyst, simultaneously in the presence of each other. One method is to vaporize the reactants in the presence of each other and subject the mixed vapors to the reaction conditions. In these methods, control of the ratio of reactants may be had through individual control of each reactant into the system employed.

In these prior methods of distillation or reactant vaporization, no means are provided for control of the pressure within the vaporizing zones in accordance with the vaporizing characteristics of the fluids or reactants being treated, nor are means provided for the maintenance of a substantially constant differential pressure between successive zones as the vaporization or reaction proceeds. In addition, these prior methods do not provide for control of the flow of fluids or reactants through the successive vaporizing or reactant zones in accordance with the rate of vaporization or rate of reaction. Nor are means provided for positively controlling the differential pressure between successive reactant or distilling zones irrespective of the rate of withdrawal of vapors therefrom and irrespective of the rate of heat input.

The present method and apparatus are designed to provide a vaporizing system for separating individual components of a liquid as in distillation of a fluid or the vaporization of reactants to provide a prepared reactant mixture wherein the disadvantages of the prior art methods and apparatus are overcome, and numerous additional advantages and expedients become apparent or are inherent therein.

Accordingly, it is a fundamental object of this invention to provide an apparatus and method for the control of residence time and volume or rate of flow of fluid passing through successive differential pressure zones of a reactor, feed preparation unit, or distilling unit wherein such control is imparted by means of a variable barometric leg or differential pressure head directly connected to said fluid.

It is a second object of this invention to provide a method and apparatus to control the residence time and flow of supernatant liquid passing through successive pressure zones in a reactor by externally controlling the level of the subnatant liquid by means of a differential pressure head.

A third object of this invention is to provide an apparatus and method of control of residence time and volume or rate of flow of supernatant liquid passing through successive pressure zones of a reactor or feed preparation unit wherein the means for controlling and automatically adjusting the residence time and volume or rate of flow is independent of the differential pressures created by a differential pressure head within the zones or the rate of withdrawal of distilled vapors or reactant vapors therefrom.

The invention comprises, therefore, a method and apparatus for preparing reactant mixtures, conducting distillations of multi-component fluids or preparing feed fluids for subsequent treatment, which apparatus has the features of construction, combination of elements, and arrangement of component parts hereinafter described, including a plurality of separate vaporization zones providing for liquid communication with each other under distilling conditions and having provision for being maintained under different pressures in the vapor zones thereof, and a method involving the several steps and relation of one or more of such steps with respect to the other steps. The details of the construction of the apparatus and operation of the method for carrying out the vaporizations or distillations in apparatus constituting the invention is more clearly understood by referring to the accompanying drawing and the specification explanatory thereof. The drawing is a longitudinal cross-section through one form of the apparatus showing in diagrammatic form the relationship of the component parts.

Since the apparatus of the present invention may take the form of a laboratory still or reactor constructed of glass or other suitable material or may take the form of an industrial unit adapted to distill or react fluids or vapors on a large scale, it will first be described generally in relation to the drawing, then the various functions of the parts will be discussed and finally the industrial applications of the apparatus will be described.

In the drawing, the main body of the apparatus is represented by column 1, which may be of any desired length and have any cross-sectional shape. The preferred form of column 1 is cylindrical. Column 1 has at its top portion the annular space 2, and at its bottom the recess 3 for insertion of any suitable heating element. Recess 3 may extend any distance into the column 1 that will give the necessary heat transfer surface. Column 1 communicates at its bottom through transfer tube 4 with reservoir 5. Column 1, transfer tube 4, and reservoir 5 are double-walled to provide jacket space 6, through which a heat transfer medium may be passed, for the purpose of imparting heat to the apparatus. Inlet tube 7 and outlet tube 8 communicate with jacket space 6 for this purpose.

That portion of the apparatus which is not double-walled may be covered with a suitable insulating material.

Within the center portion of column 1 and substantially concentric with the sides thereof is an inverted open-end inner column 9, projecting substantially the entire length of column 1 from the top thereof, where it is sealed to column 1, to the bottom thereof or in proximity of recess 3. Recess 3 may extend up inside inner column 9 for better heat transfer. Inner column 9 may be of any cross-sectional shape, preferably cylindrical, and is open at its bottom end and in direct communication with the interior of column 1. The top of inner column 9 is shown as sealed to the top of column 1, but this arrangement may be changed wherein column 9 extends beyond the top of column 1 to any desired distance. Outlet 10, controlled by valve 11, communicates with space 12 within column 9. Inlet 13, controlled by valve 14, communicates directly with the inner portion of inner column 9 for the purpose of admitting vaporizable materials or reactants thereto.

The space 2 of column 1 is provided with outlet 15, controlled by valve 16. Outlet 15 may communicate with any portion of the space 2 of column 1, although the preferred position of outlet 15 is near the top of column 1. Likewise, reservoir 5 is provided with outlet 17, controlled by valve 18, and serves as a means for introducing or withdrawing reactant or sealing media. Outlet 17 is connected with independent pressure control means for macro-adjustment of the pressure and consequently the liquid level in reservoir 5.

Reservoir 5 and lower portion of column 1 are shown partially filled with a liquid 19. Liquid 19 may take the form of a sealing medium, a reactant, or an unvaporizable portion of distilling liquid. Reservoir 5 is provided with plunger 20, which is partially immersed in liquid 19 and may be raised or lowered a desired distance for the purpose of causing small or micro-changes in the level of liquid 19 both in reservoir 5 and in column 1. One such means for the movement of plunger 20 is magnetic coil 21. The plunger 20 is made of soft iron in order to be responsive to the magnetic field of the coil. It is to be understood that other means for raising and lowering the liquid 19 may be employed than the plunger and coil arrangement shown. Reservoir 5 may be fitted with a liquid-tight piston and rod which are actuated by mechanical means external of reservoir 5. The means of actuation may be mechanical, as a ratchet and pinion gear operated by a motor, or pneumatic as compressed air or hydraulic through oil pressure. Any equivalent mechanical, electrical, or hydraulic means are contemplated as means for raising or lowering the level of liquid 19 within reservoir 5.

Column 1 is provided with draw-off 22, controlled by valve 23. Draw-off 22 has its upper end terminating at a point above the lower open end of column 9 and below the terminus of inlet tube 13. An independent vessel (not shown) may be in communication with draw-off 22 which is maintained at a pressure equal to the pressure within space 2. A thermowell, which functions as a means for detecting the temperature along the vapor and liquid phases within column 1, is designated at 24.

Whether the apparatus functions as a fractionator, a reactor, or a feed prepaartion unit, it is contemplated that liquid 19 will be present in sufficient volume to fill column 1 to a point above the lower open-end of column 9, that part of the fluid being distilled or reacted will accumulate within column 9 above the level of liquid 19 therein, and that by manipulation of the apparatus or through its inherent operation portions of the material within column 9 will travel under the lower edge of column 9 and seek a level within column 1 not exceeding the height of draw-off 22.

To show the relationship of these various features of the component parts of the apparatus, the level of liquid 19 within column 1 and inner column 9 is indicated at A. The lower open-end limit of column 9 within column 1 is indicated at level B. The upper liquid level of any material within inner column 9 is indicated at C. D represents the upper level of any material within column 1 and is controlled by the length or upper limit of draw-off 22. The material within inner column 9 is designated 25, and the material which has passed from within column 9 into column 1 and attained a level above the level of sealing media therein, is designated as 26. The space above core 20 and liquid 19 within reservoir 5 is designated as 27.

Thus, it is seen that the annular space 2 of column 1 is sealed off from space 12 of column 9 by sealing liquid 19. Liquid 19 may be any inert heat transfer liquid having a low vapor pressure under the conditions of operation imposed, or liquid 19 may be a reactant liquid, vaporizable under the conditions imposed. As heat transfer liquids, there may be used sulfur, Dowtherm, diphenyl, or any other chemically stable, inert material compatible with the other fluids present in the apparatus. Mercury is one form of liquid which may be used within the apparatus. When liquid 19 is a reactant, as sulfur, a portion thereof will be vaporized in the vaporizing zones. Liquid 19 may serve the sole purpose of sealing the two spaces 2 and 12 from each other within the apparatus. On the other hand, liquid 19 may, in addition to functioning as a sealing medium, be capable of vaporizing or reacting, or both, with the material introduced through inlet 13 of the apparatus. Liquid 19 may react or vaporize with part or all of the material treated within either of zones 2 or 12. It may be introduced through tube 17 while valves 11, 14, 16, and 23 are open.

At the start of any operation of the apparatus, the sealing medium 19 is caused to seek level A, which will be referred to as the reference level. This creates two zones or spaces 2 and 12 wherein physical transformations and/or chemical reactions can be conducted simultaneously or sequentially under the most favorable heat exchange relationships and under different pressures. These different pressures are created within spaces 2 and 12 by appropriate means connected to outlets 10 and 15 therefrom. Such means include fractionating columns and/or condensers and receivers. These means may be individual or multiple and are each adapted to control the pressures within spaces 2 and 12. The pressures within spaces 2 and 12 may be atmospheric, super-atmospheric, or subatmospheric, as the particular operation contemplated may require.

For purposes of illustration, the pressure within space 12 will be designated $P_1$ and the pressure within space 2 as $P_2$. By definition, the difference between $P_1$ and $P_2$ is expressed by the following equation:

$$P_1 - P_2 = Pd \text{ (pressure differential)}$$

Through the function of the individual or series pressure control means, one concept of the operation of the apparatus will be the maintenance of $P_1$ greater than $P_2$ so that $Pd$ is algebraically positive. Under this concept, the differential pressure $Pd$, defined as positive and expressed in millimeters of mercury, can have under ideal conditions as its lower limit a value of zero and as its upper limit a pressure equal to the density of the liquid 19, expressed in grams per cubic centimeter at the operational temperature, times the distance AB (the depth of immersion of column 9, expressed in millimeters), divided by the density of mercury at the operational temperature T. Within these limits of differential pressure, changes in level of liquid 19 in columns 1 and 9, caused by changes in volume of liquid 19 in reservoir 5 either produced in macro-proportions through independent pressure control means influencing space 27 through outlet 17, or in micro-proportions by means of coil 21, will produce no change in pressure $Pd$.

However, it is seen that with the apparatus designed as it is, there are several influences causing deviations from these ideal conditions. The presence of the column of accumulated material 25 having, for purposes of illustration, a boiling point above the operational temperature T at pressure P₁ acts to depress the level of liquid 19 in column 9. Under ideal conditions where all reactants or products other than liquid 19 are gases or vapors with P$d$ positive and equal to its upper limit, any slight tendency for the system to exceed this limit would cause gas or vapors to pass from space 12 to space 2. However, with the presence of accumulated material 25, the tendency is instead to transfer material 25 from space 12 to space 2. If conditions within the system are such that the weight of the column of accumulated material 25 becomes equal to the weight of the column of the sealing medium 19 which was at first present in column 9 under initial ideal conditions of P$d$, then, even though the value of the pressure differential P$d$ is zero, the material 25 will have depressed the level of liquid 19 in column 9 so that material 25 will be ready to pass under the lower edge of column 9. When this condition arises, regardless of the differential pressure value, the passage of material 25 into space 2 can be halted by raising the reference level A of the liquid 19, thus increasing the weight of liquid 19 to be displaced before such passage.

Alternately, the passage of accumulated material 25 within column 9 can be accelerated in its travel to space 2 by lowering reference level A. The raising and lowering of reference level A is controlled by means of the pressure within reservoir 5 and by manipulation of coil 21 or other equivalent mechanical means, as has been described.

In addition to the primary influence due to non-ideal conditions described in connection with accumulated material 25, there is a secondary deviation influencing the movement of material 25. The column of accumulated material 26 within column 1, which represents material which has passed through column 9 and which may or may not have lost components due to reaction or vaporization or both therein, operates to negate the influence exerted by the accumulated material 25, tending to reduce the tendency of material transfer from space 12 to space 2. Since the vertical column height or distance AD is kept at a predetermined value, the negative influence of the column of material 26 is substantially constant. This is accomplished by draw-off 22 which is connected to a separate vessel, not shown, which is maintained at a lower level than A and at a pressure equal to P₂.

It is apparent that this invention provides means for utilization and control of the reference level A of liquid 19 to accelerate or retard the passage of accumulated liquid from space 12 regardless of the value of the differential pressure P$d$. Thus, regardless of whether the value of P$d$ is large or small, within the initial ideal limits, by manipulation of the pressure within space 27, for macro-adjustments and manipulation of plunger 20, for micro-adjustments, or other mechanical means, there is obtained controlled flow of reactants or distilling components through the apparatus.

Having thus far described the specific components of the apparatus and the general theory of its operation, applicant will now describe the actual manipulation of the apparatus with specific examples.

A specific example of the operation of the apparatus as a distilling unit comprises using a feed liquid containing equal parts of benzene, toluene, and ethyl benzene, the three lowest boiling aromatics. The mixture is heated to a temperature slightly above the boiling point of benzene and maintained at sufficient pressure to prevent vaporization thereof. Suitable heating medium is introduced through jacket area 6 by means of inlet 7 and outlet 8 to bring the apparatus to a temperature nearing the operational temperature. Suitable inert heating liquid 19 is introduced and brought to operational temperature by means of a heating coil within recess 3. The liquid mixture is introduced into zone 12 by means of inlet 13. Zone 12 is maintained at a temperature about half way between the boiling point of benzene and toluene and the pressure therein so adjusted to allow the vaporization, substantially a flash vaporization, of the major portion of benzene. Vapors issuing from outlet 10 will have a composition compared with that of the feed greatly enhanced in benzene, substantially reduced in toluene and greatly reduced in ethyl benzene. A liquid residue comprised substantially of toluene and ethyl benzene will build up the level C in column 9 and automatically depress the level A until gradually the liquid phase will travel under the lower open end of column 9 to seek level D within column 1. The space 2 above the liquid mixture is maintained at a lower pressure but substantially the same temperature as space 12. Within space 2, further vaporization occurs and the vapors issuing from outlet 15 will have a composition, compared with that of the original feed, greatly reduced in benzene, greatly enhanced in toluene and substantially reduced in ethyl benzene.

As the distillation continues, a residue comprised substantially of ethyl benzene accumulating within column 1 represented by liquid 26 will overflow and be drawn off by draw-off 22.

Thus, by this example, the composition of a three component mixture is altered through a two-step flash vaporization under isothermal conditions. This eliminates the necessity of advancing the rate of heat input as the vapor pressure of the distilling mixture lowers and the disadvantages inherent in the additional heat necessary to overcome the back pressure of a multiple plate column. The only purpose of applying heat through recess 3 or heating jacket 6 is to replace the latent heat of vaporization and other incidental heat losses.

The apparatus may be used to distill crude petroleum to obtain therefrom at least three distinct fractions. For example, a crude oil may be introduced into space 12 by means of inlet 13. The gas content will flash off through outlet 10 and, as the distillation continues, the low viscosity lube oil fraction will accumulate as liquid 25. By means of manipulating the level A of liquid 19, which in this case may be Dowtherm, or by means of the hydrostatic head created through the accumulation in column 9, the low viscosity lube oil fraction will pass to within column 1 (shown as material 26) and there be vaporized under optimum conditions to be collected by means of a condenser attached to outlet 15. The residuum will be collected by outlet 22.

When the apparatus is to be used as a reactor, or for the preparation of a mixture of reactants for subsequent reaction, one of the reagents may be used as the liquid 19, which may be called a sealing and heating medium. Thus, mixtures of hydrocarbon and sulfur vapor for reaction to form carbon disulfide or mercaptans can be prepared by using sulfur, M. P. 120° C., B. P. 445° C. as the sealant while the hydrocarbons are introduced into column 9 of the apparatus. Similarly, mixtures of hydrocarbon vapor and vapors of aluminum chloride, M. P. 194.5° C. (under pressure), B. P. 183.7° C,. can be prepared by using aluminum chloride as the sealant. Generally, the selection of the sealant to be used, if it is to be something other than the crude itself or residuums therefrom, will depend upon matching the object to be accomplished and the temperature to be used in distillation against the melting point, reactivity, and cost of the sealant. Such sealants as salt, molten alloys, etc., may also be used since they are good heat transfer materials. When the apparatus is shut down, such sealants will solidify but may be melted again on re-starting the apparatus.

It is contemplated that more than two concentric vaporizing zones may be employed in the apparatus and method of this invention. If two or more columns similar to column 9 are used in the apparatus, their open bottom ends may terminate equidistant from the bottom of the column 1. One form of apparatus includes that having the successive open bottom ends of a plurality of inner vaporizing zones at successively closer distances from the bottom of the apparatus, each being sealed from the other by the sealing liquid 19. In using this embodiment, very little adjustment of the level of liquid 19 therein will be necessary to cause the flow of any accumulated residue from one zone to the next successive zone. If the apparatus is constructed of glass, the various liquid levels will be visible. In industrial applications where steel construction is contemplated, liquid level indicating devices may be associated with each zone.

Other applications to which the apparatus and method may be applied include the stripping of lubricating oils after solvent refining; separating mixtures of ortho-, meta-, and para-xylenes in azeotropic distillation; breaking constant boiling mixtures by changing the volume ratio or by going to low pressures; and extractive distillation of aromatics from crude petroleum.

Having thus disclosed the elements and combination of elements of the apparatus and the steps of the process applicable thereto, it is seen that the present invention may be applied to many types of distillations and reactions and numerous modifications thereof wherein the conditions, the rate of flow, volume of flow, and variations in pressure differential can be maintained or altered at the operator's discretion by means external of the distilling or reaction zones. Although specific illustrations have been used to describe the invention, the only limitations thereon appear in the appended claims.

What is claimed is:

1. A distilling apparatus comprising in combination an enclosed outer vessel having an upper distilling zone and a body of sealing liquid in the bottom thereof, a first pressure control means connected to said upper distilling zone, an inner elongated vessel within and spaced from the sides of said outer vessel, said inner vessel having an enclosed top defining a second distilling zone and an open bottom, said open bottom having an edge perpendicular to the longitudinal axis of said inner vessel, said edge being immersed in said body of sealing liquid, a second pressure control means connected to said second distilling zone, means for introducing a distilland into said second distilling zone, draw-off means connected to the space between said outer vessel and said inner vessel at a point above the level of said sealing liquid and within said upper distilling zone for maintaining a maximum upper level of distilland, said distilland and said sealing liquid forming an interface in both said inner and outer vessels, said interface defining the bottom of said distilling zones, a sealing liquid reservoir communicating with said body of sealing liquid, means within said reservoir to alter the pressure therein and thereby raise and lower said interface above and below said edge of the open bottom of said inner vessel in cooperation with said first and second pressure control means to control the flow of said distilland from said second distilling zone into said upper distilling zone, and means for applying heat to said apparatus.

2. An apparatus in accordance with claim 1 in which the means for heating said apparatus includes a heater extending through said body of sealing liquid at the bottom of the outer vessel.

References Cited in the file of this patent

UNITED STATES PATENTS

| | | |
|---|---|---|
| 1,242,292 | White | Oct. 9, 1917 |
| 1,318,657 | Frasch | Oct. 14, 1919 |
| 1,392,788 | Paris, Jr. | Oct. 4, 1921 |
| 1,784,262 | Wheeler et al. | Dec. 9, 1930 |
| 1,799,414 | Earl et al. | Apr. 7, 1931 |
| 1,852,205 | Gensecke | Apr. 5, 1932 |
| 2,081,988 | Dreyfus | June 1, 1937 |
| 2,151,990 | Ruys | Mar. 28, 1939 |
| 2,214,368 | Greensfelder et al. | Sept. 10, 1940 |
| 2,315,422 | Hildebrandt | Mar. 30, 1943 |
| 2,443,970 | Waddill | June 22, 1948 |
| 2,578,469 | Goldsbarry et al. | Dec. 11, 1951 |

FOREIGN PATENTS

| | | |
|---|---|---|
| 6,959 | Great Britain | of 1893 |
| 264,476 | Great Britain | Mar. 1, 1928 |
| 494,344 | Great Britain | Oct. 25, 1938 |
| 222,243 | Switzerland | Oct. 1, 1942 |
| 554,516 | Germany | July 9, 1932 |